Sept. 2, 1952  J. HALLER  2,608,826
COMPOUND HYDRAULIC MOTOR WITH TELESCOPING PISTONS
Filed Oct. 20, 1947  7 Sheets-Sheet 1
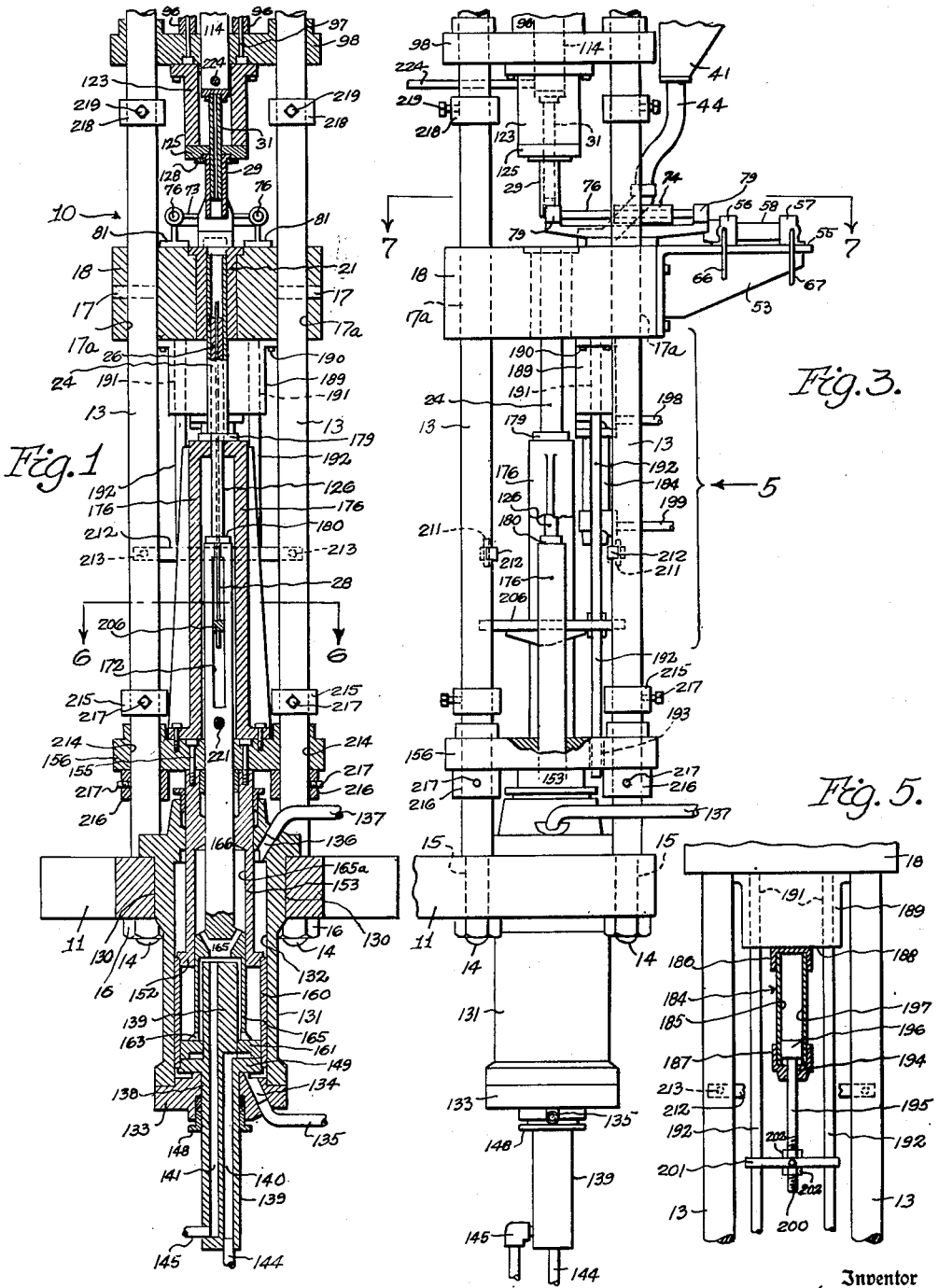

Sept. 2, 1952 J. HALLER 2,608,826
COMPOUND HYDRAULIC MOTOR WITH TELESCOPING PISTONS
Filed Oct. 20, 1947 7 Sheets-Sheet 2
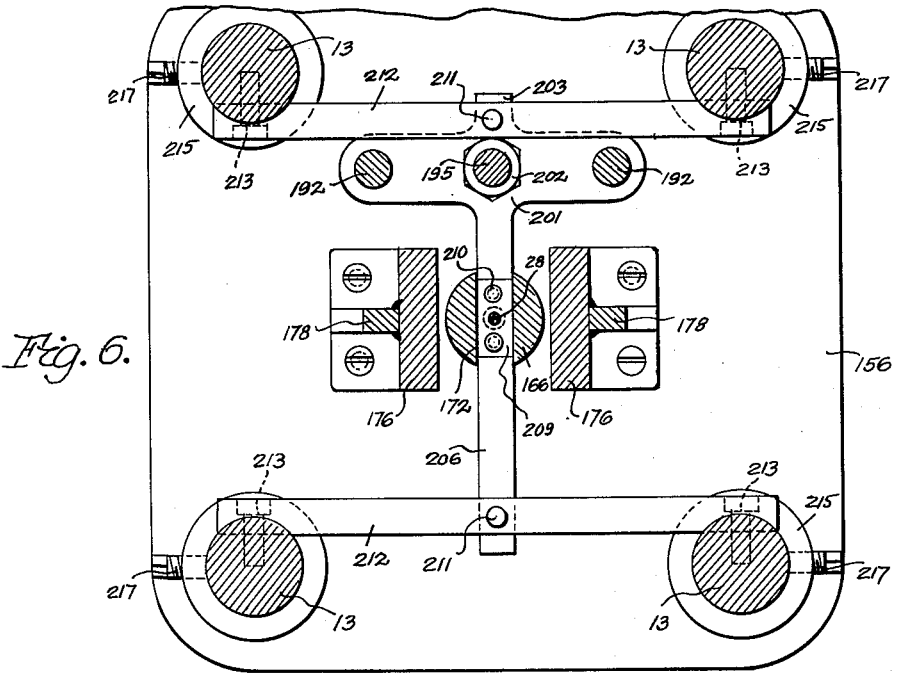
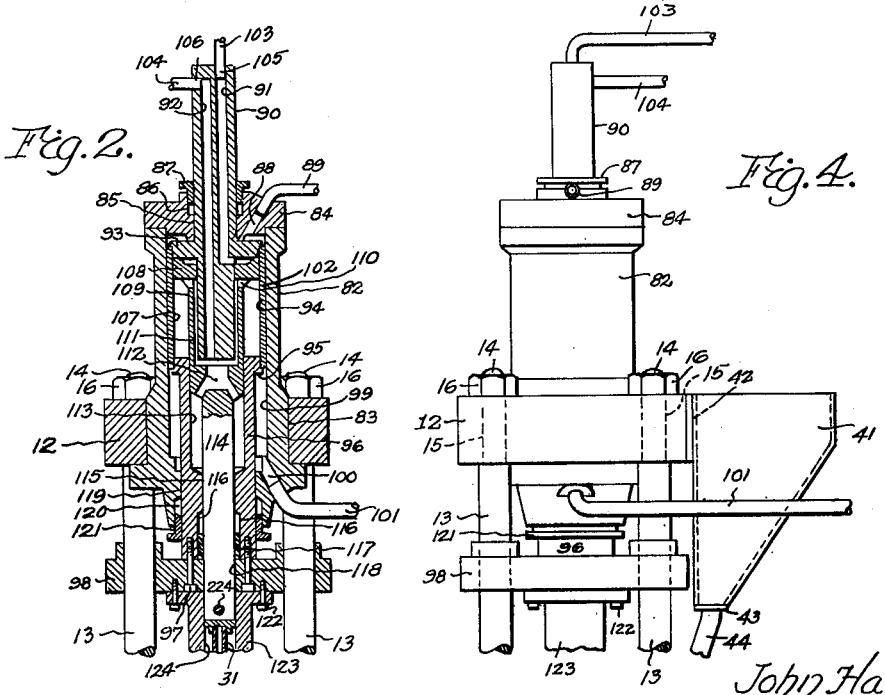
Inventor
John Haller
By Barthel & Bugbee
Attorneys Sept. 2, 1952   J. HALLER   2,608,826
COMPOUND HYDRAULIC MOTOR WITH TELESCOPING PISTONS
Filed Oct. 20, 1947   7 Sheets-Sheet 3

Inventor
John Haller
Barthel + Bugbee
Attorneys

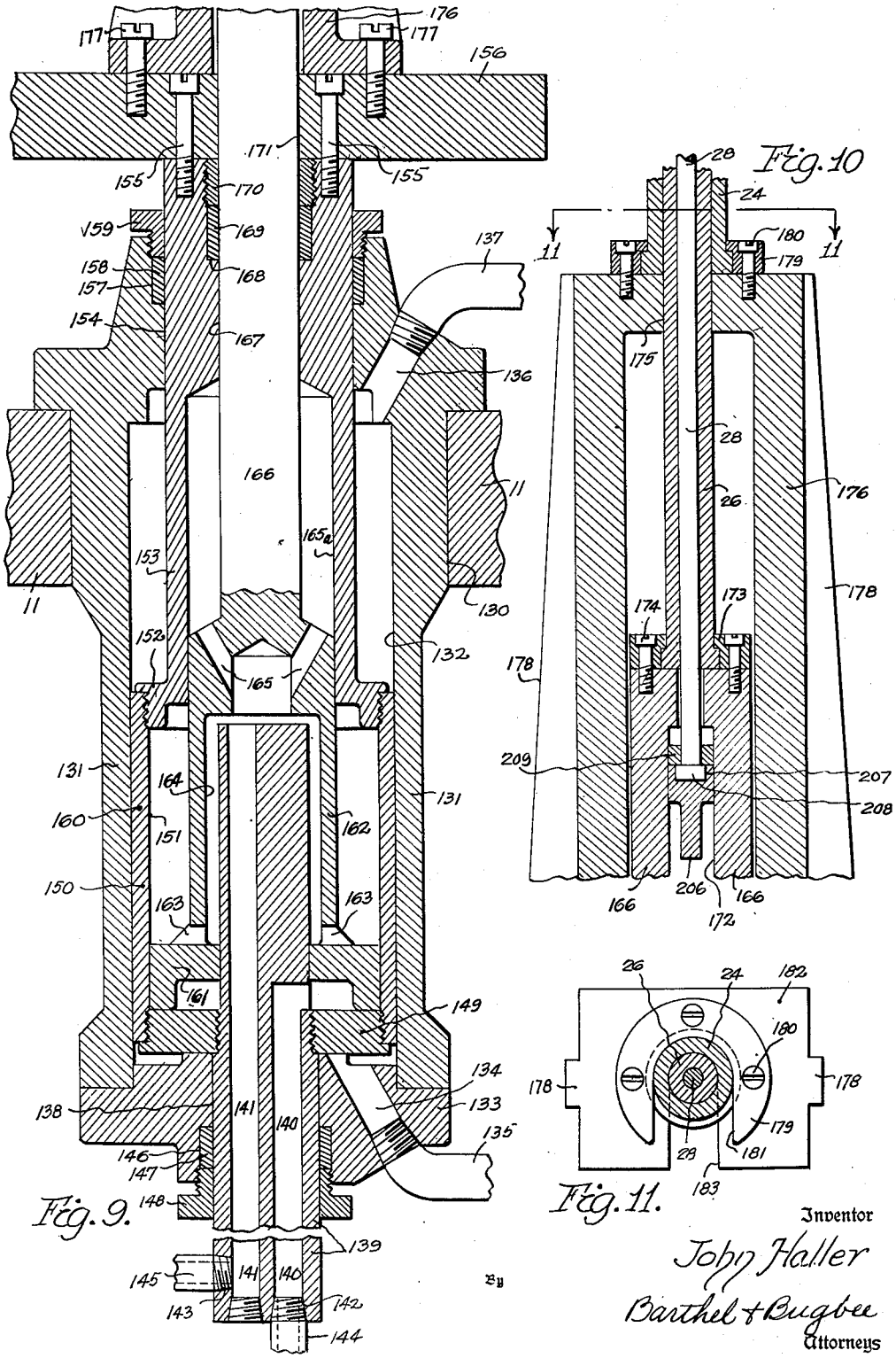

Sept. 2, 1952            J. HALLER            2,608,826
COMPOUND HYDRAULIC MOTOR WITH TELESCOPING PISTONS
Filed Oct. 20, 1947            7 Sheets-Sheet 5
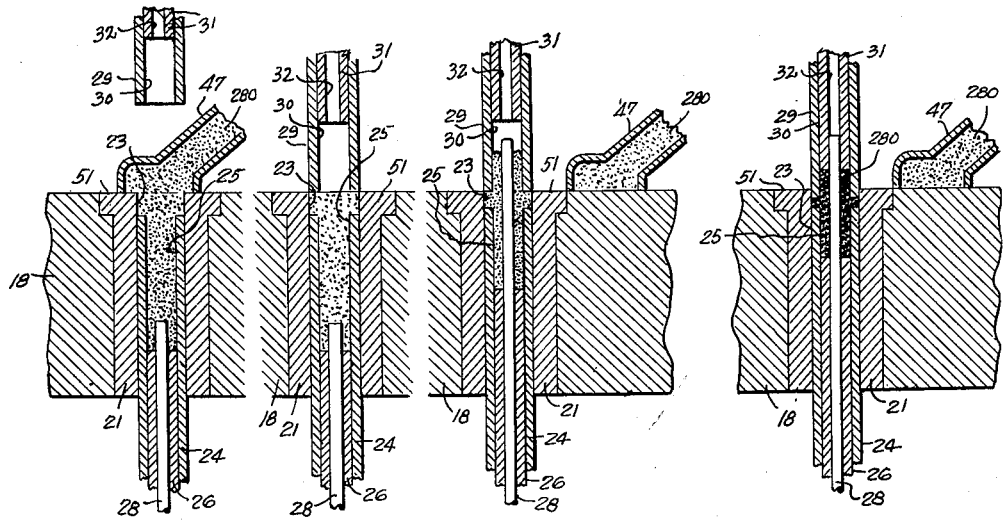
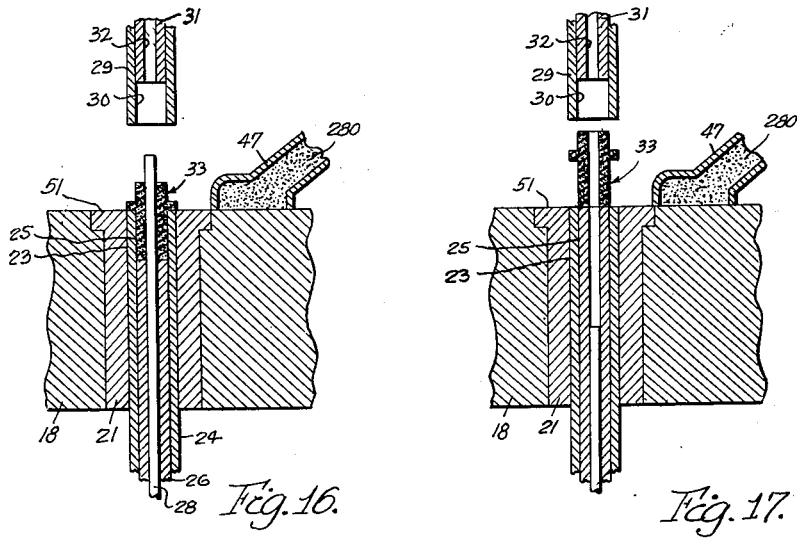
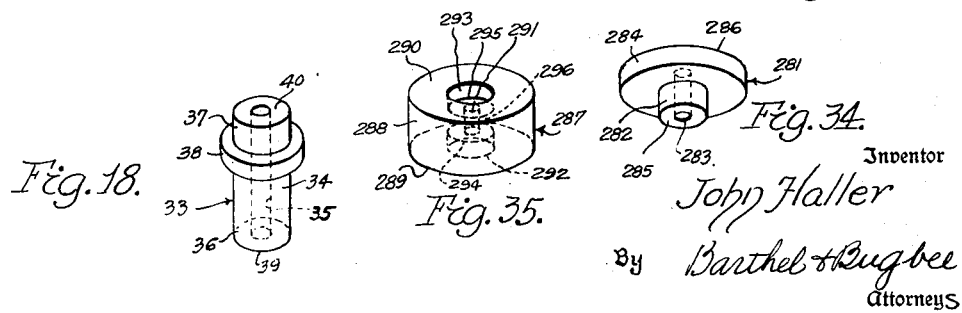
Inventor
John Haller
By Barthel & Bugbee
Attorneys

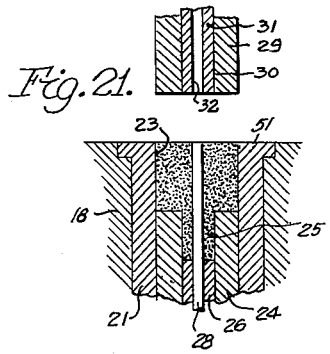
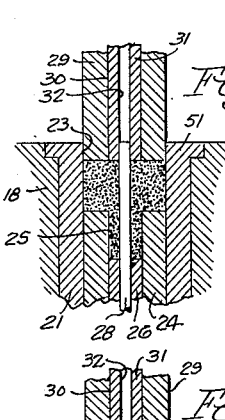
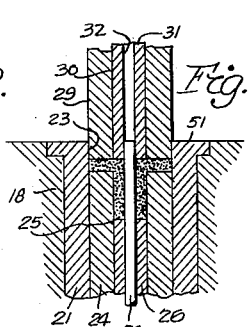
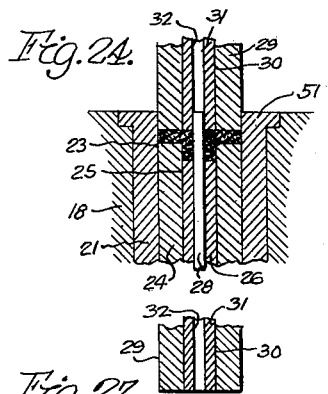
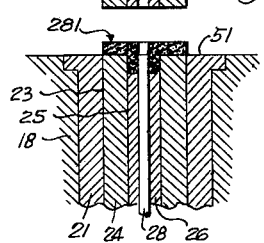
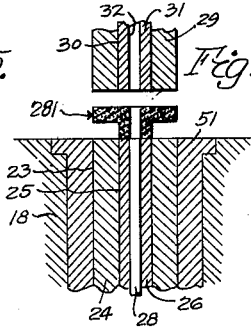
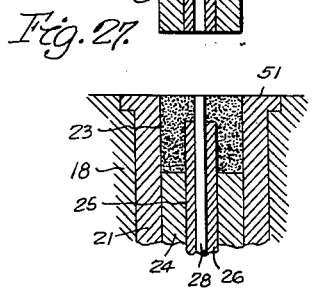
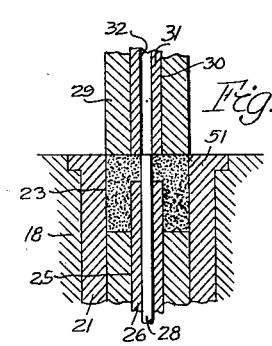
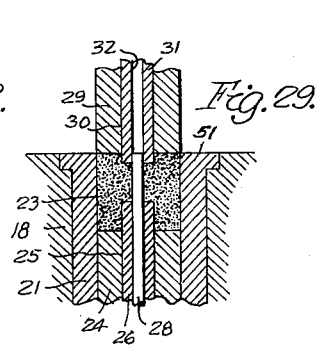
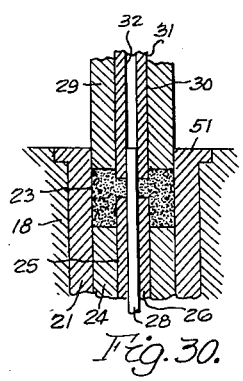
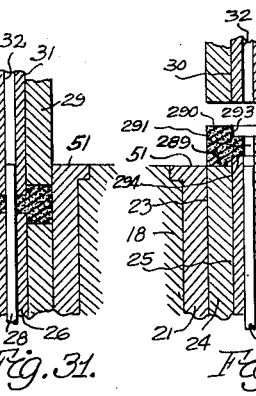
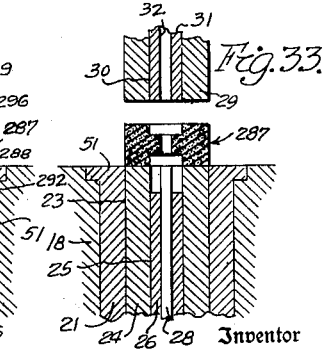

Patented Sept. 2, 1952

2,608,826

UNITED STATES PATENT OFFICE 2,608,826

COMPOUND HYDRAULIC MOTOR WITH TELESCOPING PISTONS

John Haller, Northville, Mich.

Application October 20, 1947, Serial No. 780,851

3 Claims. (Cl. 60—97)

This invention relates to molding machines and processes, and in particular to such machines and processes for making articles by compressing powdered materials, such as powdered metals and their alloys.

One object of this invention is to provide an improved machine for making powdered metal bushings according to a sequence of operations, and enabling a flange, either internal or external, to be formed upon the bushing.

Another object is to provide a machine for making flanged bushings from powdered metal wherein the powdered metal is loaded into a die and tubular telescoping plungers are reciprocated to compress the powdered metal and form the flange on the bushing.

Another object is to provide a machine for molding flanged bushings from powdered metal wherein tubular outer and inner forming plungers are caused to reciprocate in opposite directions toward one another, the reciprocation of the outermost or innermost pistons being terminated at a distance from one another equal to the thickness of the flange desired on the bushing, depending on whether the flange is to be formed on the outside or on the inside of the bushing.

Another object is to provide a machine for molding flanged bushings from powdered metal, as set forth in the preceding objects, wherein the various forming plungers of the machine are actuated by hydraulic motors controlled by a hydraulic circuit.

Another object is to provide a process of making flanged bushings of powdered metal, wherein the powdered material of the bushings is compressed from opposite directions in zones at different distances from the central axis, the compression being halted in the outermost or innermost zone at a predetermined separation of the opposite surfaces of that zone, depending on whether the flange is to be formed on the outside or inside of the bushing.

In the drawings:

Figure 1 is a central vertical section through the lower portion of a molding machine for molding flanged powdered metal bushings, according to a preferred form of the invention;

Figure 2 is a central vertical section through the upper portion of the molding machine shown in Figure 1;

Figure 3 is a side elevation of the lower portion of the machine shown in Figure 1, with a portion thereof in section;

Figure 4 is a side elevation of the upper portion of the molding machine shown in Figure 2;

Figure 5 is a fragmentary rear elevation, partly in section, of the portion of the machine included by the bracket in Figure 3 and looking in the direction of the arrow 5 therein;

Figure 6 is an enlarged horizontal section along the line 6—6 in Figure 1;

Figure 9 is an enlargement of the lower portion of Figure 1, showing this portion of the machine in more detail;

Figure 10 is an enlargement of the central portion of Figure 1, showing the portion of the machine immediately above that shown in Figure 9;

Figure 11 is a horizontal section along the line 11—11 in Figure 10;

Figures 19, 20:
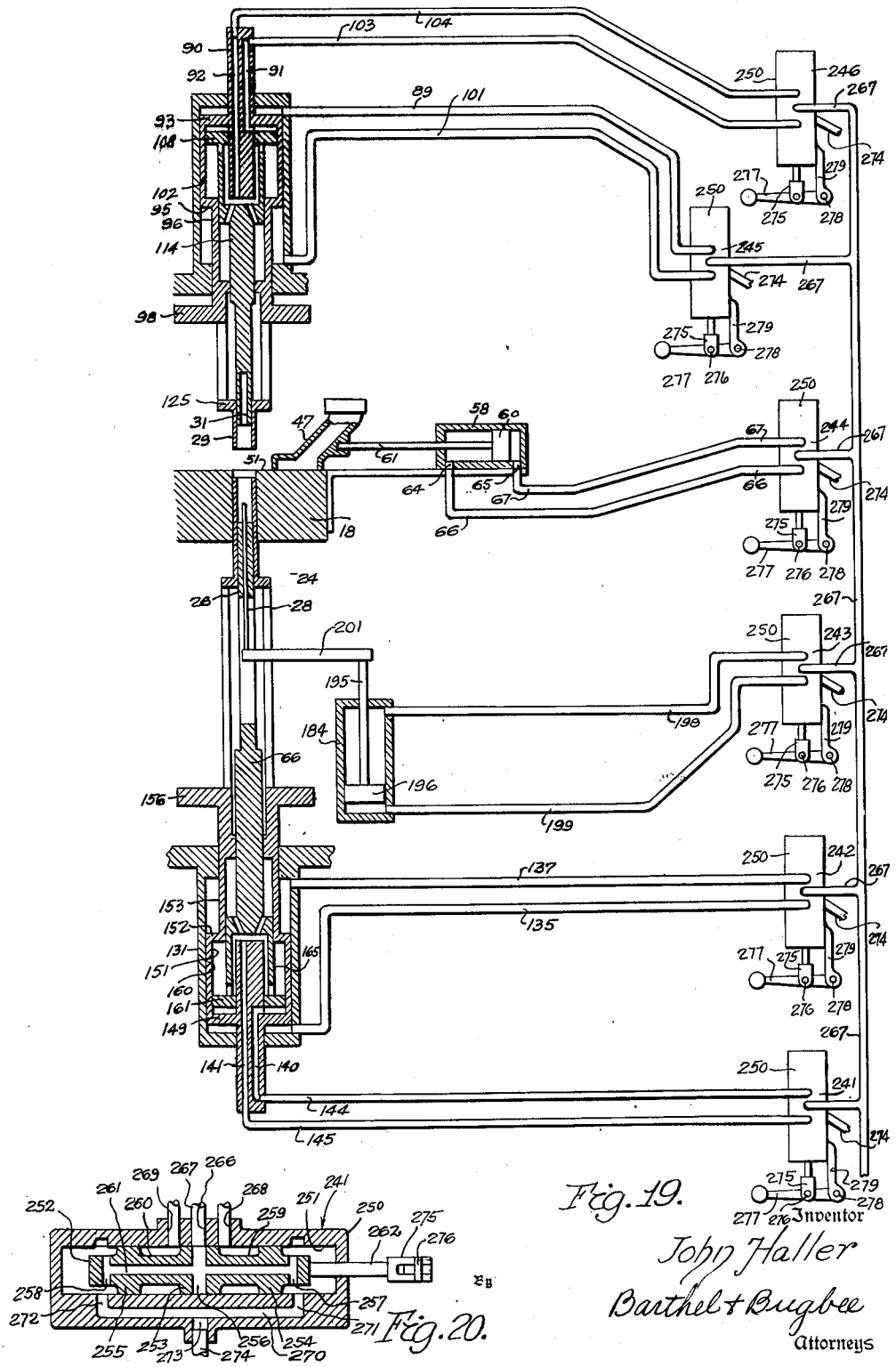

Figures 12 to 17 inclusive are fragmentary central vertical sections of the upper portion of the machine shown in Figure 1, showing diagrammatically the positions of the moving parts in the sequence of operations performed in molding a flanged bushing of powdered metal;

Figure 18 is a perspective view of a powdered metal bushing produced by the machine and process of this invention;

Figure 19 is a hydraulic circuit diagram showing an operating and control system adapted to be used with the machine and process of the present invention, with certain portions of the machine shown in vertical section;

Figure 20 is a longitudinal section through a four-way valve similar to that used for controlling the hydraulic circuit of Figure 19, but with the various conduits and ports arranged in a single plane, for simplifying the showing;

Figures 21 to 26 inclusive are fragmentary central vertical sections of the upper portion of the machine shown in Figure 1, showing diagrammatically the successive positions of the moving parts in the sequence of operation performed in molding a flanged bushing of powdered metal of modified form wherein the flange is on the outside of one end of the bushing;

Figures 27 to 33 inclusive are fragmentary central vertical sections of the upper portion of the machine shown in Figure 1, showing diagrammatically the successive positions of the moving parts in the sequence of operation performed in molding a flanged bushing of powdered metal of further modified form wherein the flange is on the inside of one end of the bushing;

Figure 34 is a perspective view of a modified powdered metal bushing produced by the machine and process of this invention wherein an external flange is formed on one end of the bushing by the operations shown diagrammatically in Figures 21 to 26 inclusive; and Figure 35 is a perspective view of a further modified powdered metal bushing produced by the machine and process of this invention wherein an internal flange is formed in the bushing by the operations shown diagrammatically in Figures 27 to 33 inclusive.

General arrangement

In general, the molding machine of the present invention includes a series of concentrically-arranged molding plungers reciprocating vertically in opposite directions relative to a fixed die with a bore therein. Reciprocating horizontally across the top of the die is a mold charging device or filler shoe for feeding the powdered metal to the mold or die from a vertical hopper. The various plungers, some of which are tubular, and the filler shoe are moved through their various cycles of operation by means of hydraulic motors including reciprocating pistons and cylinders. The supply of pressure fluid is controlled by several four-way valves.

Molding machine construction

The molding machine, generally designated 10, of the present invention (Figures 1 to 4 inclusive) is supported by a bed or base 11 and head 12 interconnected by strain rods 13 with reduced diameter end portions 14 entering corresponding bores 15 in the base and head 11 and 12, and terminating in nuts 16 threaded upon the ends of the reduced diameter portions 14.

Mounted on the strain rods 13 and secured thereto as at 17 is a die support 18. The latter is provided with bores 17a through which the strain rods 13 pass. The die support 18 (Figures 1 and 8) in turn contains a central bore or die barrel 19 having an enlarged counterbore 20 at its upper end. The bore 19 and counterbore 20 receive a sleeve-like die 21 (Figure 8) having a flanged portion 22 fitting into the counterbore 20. The die 21 contains a central bore 23 in which reciprocates a lower outer tubular plunger 24. The latter in turn is provided with a bore 25 in which reciprocates an inner tubular plunger 26. The tubular plunger 26 contains a central longitudinal bore 27 in which reciprocates a core rod 28 in the form of a solid plunger. The connections and actuating mechanisms for the concentric or co-axial plungers 24, 26 and 28 are described below in more detail.

Figure 8:
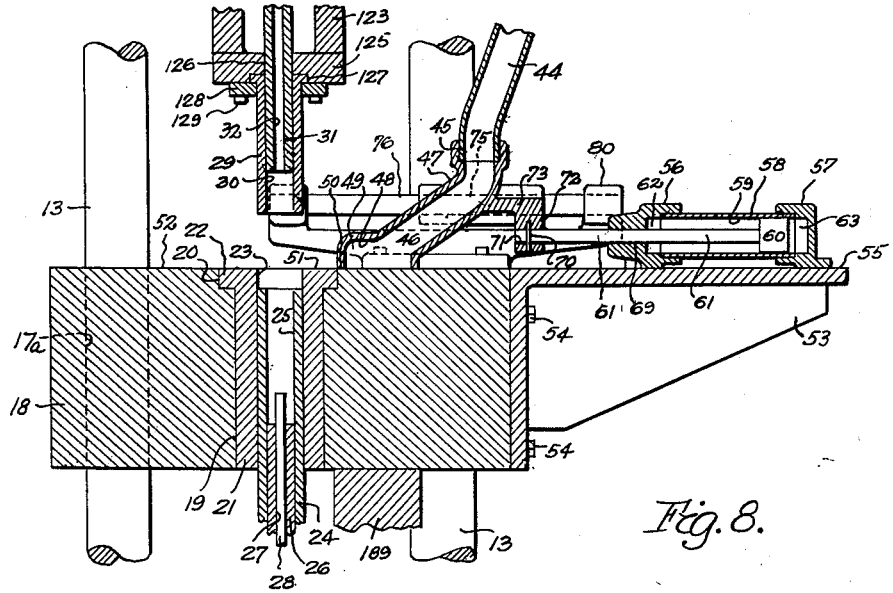
Figure 8 is a fragmentary vertical section along the line 8—8 in Figure 7.

Co-operating with the lower plungers 24, 26, and 28 and co-axial therewith are two upper tubular plungers 29 and 31 respectively (Figure 8). The upper outer tubular plunger 29 has a diameter the same as the lower outer tubular plunger 24 and is likewise adapted to enter and fit snugly but reciprocably within the die bore 23. The plunger 29 has a bore 30 therein of the same diameter as the bore 25 in the plunger 24 (assuming that the upper and lower portions of the bushing are of the same outer diameter) and in this bore the upper inner tubular plunger 31 is reciprocably mounted. The plunger 31 is provided with a central bore 32 of the same diameter as the bore 27 in the tubular plunger 26 and similarly adapted to reciprocably receive the core rod 28. The connections and actuating mechanisms for the concentric or co-axial tubular plungers 29 and 31 are also described below in more detail.

The bushing, generally designated 33 (Figure 18) of powdered metal which is made in the machine and by the process of the present invention, consists of a sleeve 34 having a bore 35 extending longitudinally through the center thereof. The sleeve 34 has a lower portion 36 and an upper portion 37 with an annular flange portion 38. The upper and lower portions 37 and 36 are assumed to be of the same diameter, but might obviously be of different diameters if such were called for by the form of the bushing. The diameters of the sleeve portions 36 and 37 are determined by the diameters of the bores 25 and 30 (Figure 8) within the lower and upper outer tubular plungers 24 and 29 and the diameter of the flange portion 38 is determined by the diameter of the die bore 23. The length of the bushing 33 between its lower and upper ends 39 and 40 (Figure 18) is determined by the closest distance of approach of the inner tubular plungers 26 and 31 (Figure 15) whereas the thickness of the flange portion 38 is determined by the distance of approach of the lower and upper outer tubular plungers 24 and 29. The diameter of the bore 35 through the bushing 33 is determined by the diameter of the core rod 28.

The feeding, charging or filling mechanism for loading the die 22 with its powdered material, such as powdered metal, is shown in Figures 3, 4, 7 and 8. The powdered material is contained in a downwardly-tapering hopper 41 which is mounted on and secured as at 42 to the head 12 of the machine 10 (Figure 4). Connected to the spout-like lower end 43 of the hopper 41 is a flexible pipe 44 the lower end of which (Figures 3 and 8) is connected to and seated in the annular recess 45 at the upper end of the passageway 46 in a charging device or filler shoe 47. The passageway 46 opens into a chamber 48 in an enlargement 49 in which the shoe 47 terminates. The lower end 50 of the shoe 47 is open and is slidable smoothly over the upper surfaces 51 and 52 of the die 21 and die support 18 respectively. The filler shoe 47 reciprocates horizontally from the positions shown in Figures 8 and 14 to 17 inclusive to the position shown in Figure 12, in order to deposit a charge of powdered material, such as powdered metal, in the die bore 23 and the associated cavities in the various tubular plungers 24, 26, 29 and 31.

Figure 7:
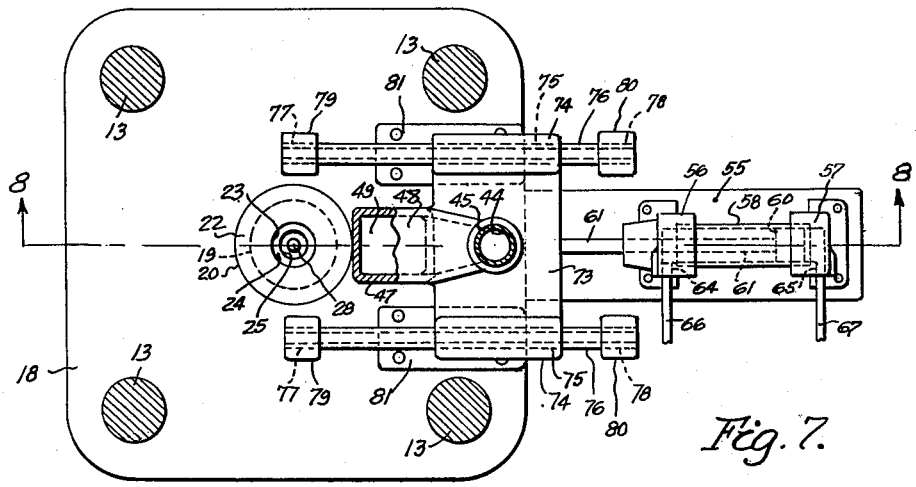
Figure 7 is a horizontal section along the line 7—7 in Figure 3 showing the powdered metal loading or charging mechanism.

The mechanism by which the filler shoe 47 is moved to-and-fro in the above manner is shown in Figures 7 and 8, and is mounted in part upon the die support 18 and in part upon an angle bracket 53 bolted as at 54 to the side of the die support 18 (Figure 8). Bolted to the upper surface 55 of the angle bracket 53 are the spaced heads 56 and 57 of a hydraulic cylinder 58, the latter having a bore 59 therein which reciprocably receives the piston head 60 connected to the piston rod 61. The cylinder heads 56 and 57 are provided respectively with chambers 62 and 63 from which ports 64 and 65 open outward (Figure 7), these in turn being connected to conduits 66 and 67 for supplying pressure fluid to the cylinder 58 or for exhausting it therefrom.

The cylinder head 56 contains a longitudinal bore 69 (Figure 8) through which the piston rod 61 passes and in which it reciprocates. The outer end of the piston rod 61 is secured by the pin 70 in a bore 71 formed in a downwardly-extending arm 72 integral with a plate-like web 73 which forms a crosshead supporting the filler shoe 47, the latter being integral with the web 73.

The web or crosshead 73 at its opposite ends (Figure 7) is provided with cylindrical bosses 74 having parallel guide bores 75. The bores 75 slidably engage tubular guide rods 76 which are parallel to one another and have their opposite ends mounted in bores 77 and 78 in the upper ends of forward and rearward arms 79 and 80 extending upward in opposite directions from base plates 81 (Figures 7 and 8) bolted to the upper surface 52 of the die support 18.

The upper outer and inner tubular plungers 29 and 31 are reciprocated by mechanism contained within the hydraulic cylinder 82 (Figures 2 and 4) mounted in a bore 83 in the head. The cylinder 82 which constitutes an outer cylinder, is closed at one end by a cylinder head 84 (Figure 2) which has a central bore 85 and a counterbore 86 equipped with a packing (not shown) and a gland 87 for compressing this packing. The cylinder head 84 is also provided with a port 88 passing therethrough and connected at its outer end to a conduit 89.

Passing through the bore 85 and gland 87 is a hollow stem 90 containing fluid passageways 91 and 92. Immediately inside the outer cylinder 82 adjacent the cylinder head 84, the stem 90 is enlarged to form an inner cylinder head 93 which is, in effect, the end of a hollow piston head. The head 93 closes the top of an inner cylinder 94, the lower end of which is closed by the enlargement 95 on the upper end of a hollow rod or plunger 96. Secured as at 97 to the lower end of the hollow rod 96 (Figure 2) is an upper platen 98. The inner cylinder 94, which in effect forms the side wall of a hollow piston head, reciprocates in an outer cylinder bore 99, access to the upper end of which is gained by the port 88 and to the lower end by a port 100 to which is connected a conduit 101.

Thus, by supplying pressure fluid to one of the conduits 89 and 101 and exhausting it from the other of these conduits, the hollow piston head 102 formed by the inner cylinder 94, and enlargements 93 and 95 may be reciprocated within the outer cylinder bore 99, shifting the hollow rod 96 and upper platen 98 upward or downward. As the piston 102 is thus reciprocated, it carries with it the hollow stem 90. Connection to the passageways 91 and 92 of the stem 90 is made by flexible pipes 103 and 104 connected respectively to the ports 105 and 106. The hydraulic circuit by which these ports are subjected to hydraulic pressure and suction is shown in Figure 19 and described below.

The hollow piston 102 or inner cylinder 94 thereof is provided with an internal bore 107 (Figure 2) in which an inner piston head 108 is reciprocable. The piston head 108 is connected to a hollow inner piston rod 109 through which ports 110 lead to an inner bore 111. The latter in turn leads through a branched passageway 112 to a bore 113 within the outer piston rod 96. The inner piston rod 109 beyond the passageway 112 continues downward in a solid extension 114 (Figure 2) which passes through a reduced diameter bore 115 and thence through a counterbore 116 containing a packing (not shown) compressed by a ring 117, and thence through a bore 118 in the platen 98. Similarly, the outer piston rod 96 passes through a reduced diameter bore 119 and a counterbore 120 also containing a packing (not shown) compressed by an annular gland 121.

Secured as at 122 to the platen 98 (Figure 2) is a flanged tubular support 123 extending downward and having a bore 124 co-extensive with the bore 118 and similarly permitting reciprocation of the extension 114 of the inner piston rod 109. Secured to the lower end of the tubular support 123 is an annular end plate 125 (Figures 1 and 8) having a bore 126 through which the inner upper tubular plunger 31 reciprocates. The end plate 125 is also provided with an annular socket 127 (Figure 8) within which the flanged upper end of the outer upper tubular plunger 29 is seated and held in position by a retaining ring 128 bolted as at 129 to the end plate 125. Thus, by the foregoing construction the passageways 92 and 91 in the hollow stem 90 convey fluid to or from the opposite sides of the inner piston head 108 (Figure 2) by way of the ports 110 and bore 111, the passageway 112 serving to drain the bore 113 surrounding the inner piston rod extension 114.

The outer and inner lower tubular plungers 24 and 26 and the core rod 28 are actuated by hydraulic motors in the form of cylinders and pistons located below the die support 18. The base or bed 11 is provided with a bore 130 (Figures 1 and 9) in which is mounted the lower outer cylinder 131 having therein a cylinder bore 132. The lower end of the cylinder bore 132 is closed by a cylinder head 133 having a port 134 therein to which is connected a conduit 135. A port 136 opens into the upper end of the outer cylinder bore 132 and is connected to a conduit 137. The cylinder head 133 is also provided with a central bore 138 through which passes a hollow stem 139 provided with passageways 140 and 141 having ports 142 and 143 connected respectively to conduits 144 and 145 (Figures 1 and 9). The bore 138 is provided with a counterbore 146 containing a packing 147 (Figure 9) compressed by an annular flange 148 to prevent leakage around the stem 139.

Immediately above the outer cylinder head 133, an inner cylinder head or piston head 149 is threaded upon the stem 139 (Figure 9). The inner cylinder 150 is threadedly connected to the inner cylinder head 149 and is thereby reciprocated in the outer cylinder bore 132. The inner cylinder 150 is provided with a bore 151 into the end of which is threaded the annular enlargement 152 on the lower end of a hollow piston rod 153. The piston rod 153 passes through a reduced diameter bore 154 in the upper end of the cylinder 131 and is bolted as at 155 to the lower platen 156. The bore 154 is provided with a counterbore 157 containing a packing 158 compressed by a gland 159, thereby preventing leakage around the outer piston rod 153. Thus the inner cylinder head 149, inner cylinder 150 and enlargement 152 (Figure 9) collectively form an outer hollow piston 160.

Reciprocable within the inner cylinder bore 151 is an inner piston head 161 connected to a hollow piston rod 162 through which the ports 163 extend into a bore 164 communicating with the passageway 141 and conduit 145. Beyond the bore 164 the branched passageway 165 leads to the reduced diameter bore 165a within the hollow piston rod 153 and in which the inner piston rod 162 reciprocates. Beyond the passageway 165, the inner piston rod 162 continues in a reduced diameter solid extension 166 (Figure 9). The latter passes through a further reduced diameter bore 167 immediately above the bore 166 and thence through a counterbore 168 containing a packing 169 compressed by a ring or gland 170, thereby preventing leakage around the inner piston rod extension 168.

The inner piston rod extension 166 passes through a hole 171 in the platen 156 (Figure 9)

and above the latter is provided with a longitudinal slot 172 (Figures 1 and 10) for the purpose of containing mechanism for reciprocating the core rod 28 as described below. Secured to the upper end of the piston rod extension 166 as by the retaining ring 173 and bolts or screws 174, is the flanged lower end of the inner lower tubular plunger 26. The latter passes through a bore 175 in the upper end of an elongated support 176 (Figure 10) which is flanged at its lower end and bolted as at 177 to the platen 156 (Figures 1 and 9). The support 176 surrounds the piston rod extension 166 and is provided with strengthening webs 178 to increase its rigidity.

The lower end of the lower outer tubular plunger 24 is flanged (Figure 10) and is secured to the upper end of the support 176 by a split flanged retaining ring 179 bolted thereto as at 180 (Figure 11). The ring 179 is provided with a gap 181 through which the outer tubular plunger 24 may be inserted, and the top 182 of the elongated support 176 is similarly provided with a slot 183 through which the inner tubular piston 26 may be inserted (Figure 11). The top 182 serves as a bridge between the parallel arms of the elongated support 176 (Figures 6 and 10), the piston rod extension 166 reciprocating in the space between these arms.

The core rod 28 is raised and lowered by a hydraulic motor 184 consisting of a hydraulic cylinder 185 with end caps or heads 186 and 187 closing the opposite ends thereof (Figures 3 and 5). The end cap 186 is secured to the underside 188 of a block 189 which in turn is bolted as at 190 (Figures 1 and 3) to the underside of the die support 18. The block 189 also contains a pair of spaced vertical bores 191 in which the upper ends of a pair of spaced vertical guide rods 192 are secured. The lower ends of the guide rods 192 pass loosely through bores 193 in the lower platen 156.

The lower cylinder head 187 is bored as at 194 (Figure 5) for the passage of a piston rod 195 carrying a piston head 196 which is reciprocable in the bore 197 of the cylinder 185. The heads 186 and 187 are bored to receive the ends of conduits 198 and 199 (Figure 3) by which pressure fluid is supplied to and exhausted from the opposite ends of the cylinder 185.

The lower end of the piston rod 195 is threaded as at 200 (Figure 5) and passes through a hole in a cross head 201 which is bored at its ends (Figure 6) for the passage of the guide rods 192. The cross head 201 is held in engagement with the lower end of the piston rod 195 by lock nuts 202 threaded on the threaded portion 200 on opposite sides of the cross head 201. This construction also provides vertical adjustment for the cross head 201 relatively to the piston rod 195.

The cross head 201 is approximately cross-shaped and is provided with an elongated inwardly projecting portion 206 which passes through the slot 172 in the inner piston rod extension 166 and is at that point provided with a socket 207 (Figure 10) in its upper surface for receiving the enlarged head 208 on the lower end of the core rod 28, being held in position by a retaining plate 209 bored for the passage of the core rod 28 and secured by fasteners 210 (Figure 6) to the projecting portion 206 of the cross head 201. The projecting portions 203 and 206 of the the cross head 201, when moved upward by the hydraulic motor 184, are adapted to contact the lower ends of limit screws 211 adjustably mounted in stop bars 212 secured as at 213 to the strain rods 13 on opposite sides of the support 176 in parallel relationship.

The lower platen 156 near its corners is provided with vertical bores 214 for the passage of the strain rods 13 so that a smooth sliding engagement is maintained therebetween. In order to limit the vertical reciprocation of the lower platen 156, upper and lower stop rollers 215 and 216 respectively (Figures 1 and 2) are mounted on the strain rods 13 and adjustably secured thereto by set screws 217. Similarly, the reciprocation of the upper platen 98 downward is limited by stop collars 218 secured to the strain rods 13 by set screws 219.

*Hydraulic circuit*

Figure 19 shows the hydraulic circuit by which the machine 10 is controlled and actuated, together with the principal parts of the machine itself as shown in more detail in Figures 1 to 10 inclusive. The various hydraulic motor consisting of cylinders and pistons have been described above, in connection with the parts which they operate, together with the conduits by which pressure fluid is supplied and withdrawn. The various hydraulic motors are double-acting, that is, reciprocable in opposite directions merely by supplying pressure fluid to one end of the cylinder while exhausting it from the other end and vice versa. Thus, the pistons of the various hydraulic motors are advanced and retracted by reversing the flow pressure fluid to the opposite ends of their cylinders.

The reversal of pressure fluid to the various hydraulic motors previously described is controlled by reversing or control valves 241 to 246 inclusive (Figure 19). The valves 241 to 246 inclusive may be of similar construction and of any conventional type, the details of which form no part of the present invention. These valves, for example, may consist of ordinary four-way valves such as are shown diagrammatically in Figure 20, the various ports and conduits of which are placed in a single plane in order to simplify their showing.

The control valve 241, for example, may consist of an approximately cylindrical casing 250 having a longitudinal bore 251 in which reciprocates a valve spool 252 having a central head 253 and end heads 254 and 255. The spool 252 is provided with a transverse passageway 256 through the central head 253 and also with transverse passageways 257 and 258 at the opposite ends thereof outboard of the heads 254 and 255. Between the heads 254 and 255 and the central head 253 the valve spool 252 is provided with reduced diameter portions 259 and 260 respectively. A central longitudinal passageway 261 interconnects the transverse passageways 256, 257 and 258.

The spool 252 is connected at one end to a valve rod 262. The spool 252 may, if desired, be provided with conventional centering spring (not shown) which normally tend to restore the valve spool 252 to its central position shown in Figure 20.

The casing 250 is provided with a central pressure supply port 266 connected to the conduit 267 which in turn is connected to the pressure side of a hydraulic pump (not shown) or other source of pressure fluid. On either side of the pressure fluid supply port 266, the casing 250 is provided with pressure fluid distributing ports 268 and 269 which are connected respectively to the conduits 144 and 145. The casing 250 is finally provided with a longitudinal passageway 270 having end ports 271 and 272 opening into the bore 251 adjacent the transverse spool passages 257 and 258 when the valve spool 252 is in its central position. The passageway 270 leads to a central discharge port 273 which in turn is connected to a discharge or exhaust conduit 274 by which the discharge fluid is returned to the tank or reservoir (not shown) which is a common and usual part of a conventional hydraulic pump circuit. The valve rod 262 is connected by a clevis 275 and pin 276 to a hand lever 277, the lower end of which is pivoted at 278 to a bracket 279 secured to the cylindrical casing 250.

Thus, when the valve rod 262 and valve spool 252 are shifted to the left (Figure 20), pressure fluid passes from the conduit 267 through the ports 266 and along the reduced diameter portion 259 to and out through the port 268 into the conduit 144. At the same time, fluid returning from the conduit 145 escapes through the ports and passageways 269, 256, 261, 258, 272, 270 and 273 into the return or discharge conduit 274 leading to the tank or reservoir.

When the valve spool 252 is shifted to the right, the port 269 becomes connected to the pressure fluid supply port 266 along the reduced diameter portion 260 of the spool 252, whereas the port 268 becomes connected to the discharge conduit 274 by way of the ports and passages 256, 261, 257, 271 and 270.

The control circuit shown in Figure 19 is illustrated as being manually controlled by the various hand levers 277, this being done for simplicity of showing. In actual practice, however, in order to make the machine fully automatic, each of the valve rods 262 will be shifted to-and-fro by a pair of solenoids placed at the opposite ends of each valve rod. The energization of the solenoids is selectively controlled by limit switches operated by arms projecting from the various plungers as they reciprocate to-and-fro. This electrical circuit, however, is beyond the scope of the present invention.

Accordingly, for the purposes of operation of the machine, it will be assumed that the hydraulic circuit is manually controlled and that the operator shifts the hand lever 277 of each of the control valves 241 to 246 inclusive at the proper moments to cause the respective plungers to reciprocate the desired distances. Obviously, the plungers will be reciprocated different distances according to the dimensions of the bushing 33 to be produced by the machine. The distances to which the various plungers may reciprocate can be controlled by stops or by merely limiting the distance to which each plunger can reciprocate within its respective cylinders. Obviously, the various plungers may also be provided with scales and pointers to indicate their motion and terminate it at the desired point to produce a bushing of the desired dimensions. Thus, when the operation is described, it will be assumed that by one of these expedients, the operator will terminate the reciprocation of the various hydraulic motors at the desired points in their strokes and do this in the proper sequence in the cycle of operations about to be described.

Operation in making intermediate-flanged external bushings

Before starting the machine 10, let it be assumed that a sufficient supply of the powdered material 280 to be molded, such as powdered bronze, has been placed in the hopper 41 (Figures 3 and 4). It will also be assumed that the various parts of the machine are in the relative positions shown in Figure 19, where they are ready to begin an operating cycle. Let it further be assumed that the conduit 267 is being supplied with pressure fluid from a suitable source such as a hydraulic pump (not shown).

To start the cycle of operations, the operator shifts the hand lever 277 of the control valve 244 so that pressure fluid is discharged from the supply conduit 267 through the valve 244 and out through the conduit 67 into the right-hand end of the cylinder 58 (Figure 19). This causes the piston head 60 and piston rod 61 to move to the left, shifting the charging device or filler shoe 47 over the mouth of the die bore 23 (Figures 8, 12 and 19). Meanwhile, the fluid displaced from the left-hand end of the cylinder 58 returns to the valve 244 by way of the conduit 66, whence it is discharged through the conduit 274 into the tank.

When the filler shoe 47 arrives over the die bore 23, particles of the material fall into and fill up the space in the bores 23 and 25 (Figure 12). The operator causes the charging shoe 47 to dwell in its charging position a sufficient length of time to insure that the die bore is properly charged, whereupon he shifts the hand lever 277 of the control valve 244 in the opposite direction. This causes pressure fluid to pass from the supply line 267 through the valve 244 into the conduit 66, thence through the port 64 (Figure 19) at the left-hand end of the cylinder 58. This causes the piston 60, piston rod 61 and charging shoe 47 to be retracted from its charging position and shifted to the right into the position shown in Figure 19. The fluid displaced from the right-hand end of the cylinder 58 passes through the port 65, conduit 67, valve 244 and discharge conduit 274 into the tank.

The operator now shifts the hand lever 277 of the valve 245 to cause pressure fluid to pass from the supply line 267 through the valve 245 and conduit 89 into the upper end of the cylinder 82 where it acts against the hollow outer piston head 93. This action moves the piston head 93 downward, carrying with it the upper platen 98, tubular support 123, end plate 125 and outer upper tubular plunger 29. The latter moves downward until it arrives at the level of the upper surface 51 of the die support 18 (Figure 13), closing the die cavities 23 and 25. The operator then shifts the control valve 245 to its central or neutral position, holding the plunger 29 temporarily in its Figure 13 position.

The operator then shifts the control valve 243 so that pressure fluid passes through it from the supply line 267 into the conduit 199 and thence into the lower end of the cylinder 184. This forces the piston 196 and piston rod 195 upward carrying with them the cross head 201 and core rod 28. The fluid displaced by the upward motion of the piston head 196 passes from the upper end of the cylinder 184, through the conduit 198 and valve 243 into the discharge conduit 274 and thence back to the tank. The core rod moves upward, pushing aside the particles of powdered material 280 until it enters the bore 30. When the core rod reaches the position shown in Figure 14, the operator shifts the valve 243 to its neutral position, holding the core rod 28 in the position shown in Figure 14.

The operator also shifts the control valve 241 to admit pressure fluid from the supply conduit 267 through the valve 241 and conduit 144 into the lower end of the inner cylinder bore 151, moving the piston head 161 upward and with it the plunger 66 and inner lower tubular plunger 26. The fluid displaced from the upper end of the bore 151 passes downward through the passageway 141, conduit 145 and valve 241 into the discharge conduit 274. When the inner lower plunger 26 reaches the position shown in Figure 14, the operator holds it there temporarily by shifting the control valve 241 to its neutral position.

The operator now shifts the control valves 245 and 246 so as to cause the upper outer and inner tubular plungers 29 and 31 to move downward, pressure fluid being supplied to the conduits 89 and 103 from the pressure fluid supply line 267 and withdrawn through the conduits 101 and 104 respectively into the discharge conduits 274. When the upper plungers 29 and 31 have moved downward to the positions shown in Figure 15, depending upon the dimensions desired for the finished bushing, the upper inner tubular plunger 31 telescopes with the core rod 28 and completely seals off the cavity occupied by the powdered material. The operator then shifts the control valve 241 again to admit pressure fluid to the conduit 144 and to discharge it from the conduit 145 in the manner previously described, causing the lower inner tubular plunger 26 to move still further upward into the position shown in Figure 15. This action further compresses the powdered material 280 and forms the bushing 33 to its desired dimensions.

The operator now shifts the control valves 245 and 246 in the manner previously described to admit pressure fluid to the conduit 101 and 104 and discharge it from the conduits 89 and 103, thereby raising the pistons 93 and 108 and with them the upper outer and inner tubular plungers 29 and 31. The parts now occupy the position shown in Figure 16, ready for ejection of the molded bushing.

To eject the molded bushing, the operator again shifts the control valve 242 to its forward position wherein pressure fluid is delivered to the conduit 135 and discharged from the conduit 137, moving the lower outer tubular plunger 24 upward until its upper end is flush with the surface 51 of the die support 18. This action raises the flange 38 on the bushing to an exposed position clear of the die bore 23 (Figure 16). At the same time he shifts the control valve 241 to admit pressure fluid to the conduit 145 and discharge it from the conduit 144, causing the lower inner tubular plunger 26 to move upward. This insures that the flange 38 and the lower end 39 of the bushing 33 will be pushed upward at the same time.

When the operator has halted the lower outer tubular plunger 24 at the level of the surface 51 of the die support 18 (Figure 16) and has shifted the control valve 242 to its neutral position, he continues to hold the control valve 241 in its forward position, causing the lower inner tubular plunger 26 to continue to move upward until its upper end also reaches the level of the surface 51. This action raises the bushing 33 so that its lower end 39 is flush with the upper surface 51 of the die support 18. Meanwhile, the operator shifts the control valve 243 to its reverse position whereby pressure fluid is delivered to the conduit 198 and is discharged from the conduit 199, moving the piston head 196 downward (Figure 19) and retracting the cross-head 201 and core rod 28 to the position shown in Figure 17.

This action pulls the core rod 28 out of the central bore 35 in the bushing 33 and enables the bushing to be ejected. The bushing 33 is then subjected to the usual sintering and other finishing operations, forming no part of the present invention.

To move the parts back into the position shown in Figure 8 ready for the molding of another bushing 33, the operator shifts the control valves 241 and 242 to their reverse positions whereby pressure fluid is delivered to the conduits 145 and 137 and discharged from the conduits 144 and 135, causing the lower outer and inner tubular plungers 24 and 26 to move downward to the positions shown in Figure 8. The operator then shifts the control valves 241 and 242 to their neutral positions and the machine is ready for the molding of another bushing 33 in the manner previously described.

*Operation in making end-flanged external bushing*

The modified bushing, generally designated 281, shown in Figure 34, consists of a body portion or sleeve 282 having a bore 283 extending longitudinally through the center thereof. The sleeve 282 has an annular flange portion 284 adjacent one end thereof, the lower and upper ends 285 and 286 respectively being formed by the oppositely-moving lower and upper outer and inner tubular plungers 24, 26, 29, 31 and core rod 28. The sequence of operations in making the modified bushing 281 is generally similar to that previously described above in making the intermediate externally flanged bushing 33 but differs in detail.

The die bores 23 and 25 are charged or loaded by manipulating the control valve 244 (Figure 19) in the manner previously described so as to move the charging shoe 47 over the top of the die bore 23. The shoe 47 is held there for a sufficient time to permit the particles of powdered bronze or other powdered metal to fill the die cavity, whereupon the shoe 47 is retracted by reversing the control valve 244. Figure 21 thus corresponds to Figure 12 after the charging shoe 47 has been retracted to the position shown in Figures 14 and 19.

In the set-up of the machine to produce the flanged bushing 281, however, it is sufficient for the purposes of the invention to hold the core rod 28 stationary with its upper end flush with the top surface 51 of the die 21. The lower outer and inner plungers 24 and 26 are held temporarily at levels below the final levels which they attain in later stages of operation, as shown by the contrast between the tops of these plungers in Figures 21 and 23. At the same time, the upper outer and inner tubular bushings 29 and 31 are held with their lower ends flush with one another and are moved up and down as a unit.

With the parts in the position shown in Figure 21, the operator now shifts the control valves 245 and 246 to cause pressure fluid to enter the conduits 89 and 103 and be discharged from the conduits 101 and 104, thereby moving the upper outer and inner plungers 29 and 31 downward a predetermined depth into the die bore 23 (Figure 22). When this occurs, the upper end of the core rod 28 enters the bore 32 in the upper inner plunger 31, sealing the die cavity completely.

With the parts in the position shown in Figure 22, the operator now shifts the control valves 241 and 242 to admit pressure fluid to the conduits 135 and 144 and to discharge fluid from the conduits 137 and 145, causing the lower outer and inner plungers 24 and 26 to move upward to the positions shown in Figure 23, partially compressing the powdered metal.

With the parts in the positions shown in Figure 23, the operator halts the upward motion of the lower outer plunger 26 by shifting the control valve to neutral, but continues to hold the control valve 241 in its forward position, causing the lower inner plunger 24 to continue to move upward. The plunger 24 moves upward, further and finally compressing the powdered metal and shortening the sleeve portion of the bushing, the control valve 242 being shifted to neutral position when the plunger 24 reaches the position shown in Figure 24.

With the parts in the positions shown in Figure 24, the operator shifts the control valves 245 and 246 to their reverse positions, retracting the upper outer and inner plungers 29 and 31 to the position shown in Figure 25. He then shifts the control valves 241 and 242 to their forward positions, causing the lower outer and inner plungers 24 and 26 to move upwardly simultaneously until the top of the outer plunger 26 is level with the top surface 51 of the die 21.

With the parts in the positions shown in Figure 25, the operator then shifts the control valve 242 to neutral while holding the control valve 241 in its forward position. This ejects the bushing 281 from the position shown in Figure 25 to that shown in Figure 26. The bushing is then removed and subjected to the additional processes such as sintering. By then shifting the control valves 241 and 242 to their reverse positions, the operator retracts the outer and inner plungers 24 and 26 to their lowered positions shown in Figure 21, whereupon the machine is ready for beginning a new cycle of operation, commencing with the charging of the die cavity with powdered metal by shifting the shoe 47.

*Operation in making mid-flanged internal bushing*

The modified bushing, generally designated 287, shown in Figure 35, consists of a body portion or sleeve 288 having lower and upper ends 289 and 290 respectively and containing a central bore 291 with lower and upper enlargements 292 and 293 respectively. The enlargements 292 and 293 terminate at shoulders 294 and 295 forming the lower and upper ends of an internal flange 296. The sequence of operations in making the modified bushing 287 is generally similar to that previously described above in making the bushings 33 and 281 but also differs in detail.

With the parts in the positions shown in Fig. 27, the die bore 23 is charged or loaded in the manner previously described by manipulating the control valve 244 (Figure 19) so as to move the charging shoe 47 over the top of the die bore 23 long enough to permit the particles of powdered metal to fill the die cavity. The shoe is then retracted by reversing the control valve 244, whereupon the parts correspond in position to those shown in Figure 12. In Figure 27, however, the lower inner tubular plunger 26 is moved so that its top end is a considerable distance above the top of the lower outer plunger 24, since the flange 296 is to be formed internally rather than externally. The core 28 is also stationary throughout the entire sequence of operation in making the internally-flanged bushing 287. Furthermore, the upper outer and inner tubular plungers 29 and 31 commence operations with their lower ends flush with one another, as shown in Figure 27.

With the parts in the positions shown in Figure 27, and with the die cavity 23 charged with powdered metal and the charging shoe 47 retracted, the operator shifts the control valves 245 and 246 to their forward positions in the manner previously described, moving the upper outer and inner plungers 29 and 31 downward until their lower ends are flush with the upper surface 51 of the die 21. This seals the die cavity 23, as shown in Figure 28.

With the parts in the positions shown in Figure 28, the operator reverses the control valve 241 to retract the lower inner plunger 26 a short distance while leaving the outer plunger 24 unchanged. He also shifts the control valve 246 to its forward position while holding the control valve 245 in its neutral position, causing the upper outer plunger 29 to remain stationary while the inner plunger 31 moves downward below the level of the surface 51, telescoping with the upper end of the core rod 28. The material of the bushing is thus partially compressed, as shown in Figure 29.

With the parts in the positions shown in Figure 29, the operator shifts the control valve 245 to its forward position while holding the control valve 246 also in its forward position, causing the outer upper and inner plungers 29 and 31 to move downward from their positions of Figure 29 to the positions shown in Figure 30, further compressing the powdered metal.

With the parts in the positions shown in Figure 30, the operator shifts the control valves 245 and 246 to neutral, holding the upper outer and inner plungers 29 and 31 in their previously-attained positions. He also holds the control valve 241 in its neutral position while shifting the control valve 242 to its forward position. This causes the lower outer tubular plunger 24 to move upward, imparting the final squeeze to the bushing 287.

To eject the bushing from the position shown in Figure 31, the operator shifts the control valves 245 and 246 into their reverse positions and retracts the upper outer and inner plungers 29 and 31 to the positions shown in Figure 32 with the lower ends of these plungers flush with one another, whereupon he shifts the control valves 245 and 246 to neutral. He then shifts the control valves 241 to 242 to their forward positions, causing them to advance simultaneously upward and eject the bushing 287 from the die cavity 23, as shown in Figure 32.

With the parts in the positions shown in Figure 32, the operator now reverses the control valve 241 to retract the lower inner plunger 26, freeing it from the bushing 287 and permitting the latter to be removed from the machine. The operator then shifts the control valve 242 into its forward position while holding the control valve 241 also in its forward position so as to retract the lower outer and inner plungers 24 and 26 down to their starting levels shown in Figure 27. The machine is now ready to commence another cycle of operations by shifting the control valve 244 to advance the charging shoe over the die cavity 23 and fill the latter with powdered metal.

What I claim is:

1. A compound hydraulic motor comprising a hydraulic cylinder having an outer bore with axially spaced fluid ports communicating therewith, said cylinder having an aperture in one end thereof, a hollow outer piston reciprocably mounted in said outer bore and having an inner bore therein coaxial with said outer bore, an outer piston rod connected to said outer piston and extending externally of said cylinder, an inner piston reciprocably mounted in said inner bore and having an aperture therethrough, an inner piston rod connected to said inner piston and extending externally of said cylinder, and an elongated fluid feed member mounted on the central portion of said outer piston in coaxial relationship therewith and reciprocable bodily therewith, said feed member extending inwardly through said inner piston aperture to the inner side of said inner piston and extending outwardly through said cylinder aperture externally of said cylinder, said feed member having a pair of fluid passageways leading therethrough and opening into said inner bore on opposite sides of said inner piston.

2. A compound hydraulic motor comprising a hydraulic cylinder having an outer bore with axially spaced fluid ports communicating therewith, said cylinder having an aperture in one end thereof, a hollow outer piston reciprocably mounted in said outer bore and having an inner bore therein coaxial with said outer bore, an outer piston rod connected to said outer piston and extending externally of said cylinder, an inner piston reciprocably mounted in said inner bore and having an aperture therethrough, an inner piston rod connected to said inner piston and extending externally of said cylinder and an elongated fluid feed member mounted on the central portion of said outer piston in coaxial relationship therewith and reciprocable bodily therewith, said feed member extending inwardly through said inner piston aperture to the inner side of said inner piston and extending outwardly through said cylinder aperture externally of said cylinder, said feed member having a pair of fluid passageways leading therethrough and opening into said inner bore on opposite sides of said inner piston, said inner piston rod having a cavity therein with a port opening from said cavity into said inner bore behind said inner piston, said feed member extending into said cavity.

3. A compound hydraulic motor comprising a hydraulic cylinder having an outer bore with axially spaced fluid ports communicating therewith, said cylinder having an aperture in one end thereof, a hollow outer piston reciprocably mounted in said outer bore and having an inner bore therein coaxial with said outer bore, a tubular outer piston rod connected to said outer piston and extending externally of said cylinder, an inner piston reciprocably mounted in said inner bore and having an aperture therethrough, an inner piston rod disposed within said tubular outer piston rod in telescoping relationship therewith, said inner piston rod being connected to said inner piston and extending externally of said cylinder, and an elongated fluid feed member mounted on the central portion of said outer piston in coaxial relationship therewith and reciprocable bodily therewith, said feed member extending inwardly through said inner piston aperture to the inner side of said inner piston and extending outwardly through said cylinder aperture externally of said cylinder, said feed member having a pair of fluid passageways leading therethrough and opening into said inner bore on opposite sides of said inner piston.

JOHN HALLER.

REFERENCES CITED

The following references are of record in the file of this patent:

UNITED STATES PATENTS

| Number | Name | Date |
|---|---|---|
| 1,684,984 | Claus | Sept. 18, 1925 |
| 1,766,265 | Smith | June 24, 1930 |
| 1,806,300 | Lemming | May 19, 1931 |
| 1,974,214 | Glasner | Sept. 18, 1934 |
| 2,300,302 | Morin | Oct. 27, 1942 |
| 2,325,687 | Kux | Aug. 3, 1943 |
| 2,350,971 | Pecker | June 6, 1944 |
| 2,447,434 | Schwartzkopf | Aug. 17, 1948 |
| 2,449,008 | Pecker | Sept. 7, 1948 |
| 2,449,257 | Tucker | Sept. 14, 1948 |
| 2,449,515 | Seelig | Sept. 14, 1948 |
| 2,499,980 | Stokes et al. | Mar. 7, 1950 |